United States Patent [19]

Traeger

[11] 4,089,448
[45] May 16, 1978

[54] BICYCLE-SKI RACK FOR AUTOMOBILES

[76] Inventor: John L. Traeger, 608 Lakeview Ave., North Mankato, Minn. 56001

[21] Appl. No.: 661,697

[22] Filed: Feb. 26, 1976

[51] Int. Cl.² .............................................. B60M 9/10
[52] U.S. Cl. ....................... 224/42.03 B; 224/42.03 R
[58] Field of Search ..................... 224/42.01, 42.03 R, 224/42.03 A, 42.03 B, 42.07, 42.08, 29 R, 42.06, 42.21, 42.46 R, 42.45 R, 42.1 H; 214/450, 451, 452, 453, 454; 211/60 SK, 17, 21, 22, 99, 100; 248/226 A, 225.3, 226.4, 291, 293; 108/44

[56] References Cited

U.S. PATENT DOCUMENTS

| 759,560 | 5/1904 | Sharp | 248/226 A X |
| 2,612,207 | 9/1952 | Branson | 224/42.03 R X |
| 2,653,002 | 9/1953 | Passman | 248/291 |
| 2,907,483 | 10/1959 | Prag | 224/42.03 R X |
| 3,275,206 | 9/1966 | Croft | 224/42.03 B |
| 3,300,111 | 1/1967 | Hedgepeth | 224/42.07 |
| 3,437,248 | 4/1969 | Allen | 224/42.03 R |
| 3,847,317 | 11/1974 | Raff et al. | 224/42.03 B |
| 3,876,123 | 4/1975 | Stuntz | 224/42.03 B |
| 3,891,132 | 6/1975 | Chandler | 224/42.03 B |

Primary Examiner—Trygve M. Blix
Assistant Examiner—Winston H. Douglas
Attorney, Agent, or Firm—Burd, Braddock & Bartz

[57] ABSTRACT

A rack for mounting on the rear deck of an automobile for carrying lightweight recreational vehicles, namely bicycles or skis. The rack is characterized by a frame pivoted in a pair of brackets clamped to the vehicle bumper, the frame being movable from an upright loading position to a lowered traveling position. The rack when used for carrying bicycles incorporates the lowered wind resistance of trunk mounted racks with the ease of loading of bumper mounted racks while avoiding the disadvantages of these types of carrier.

11 Claims, 8 Drawing Figures

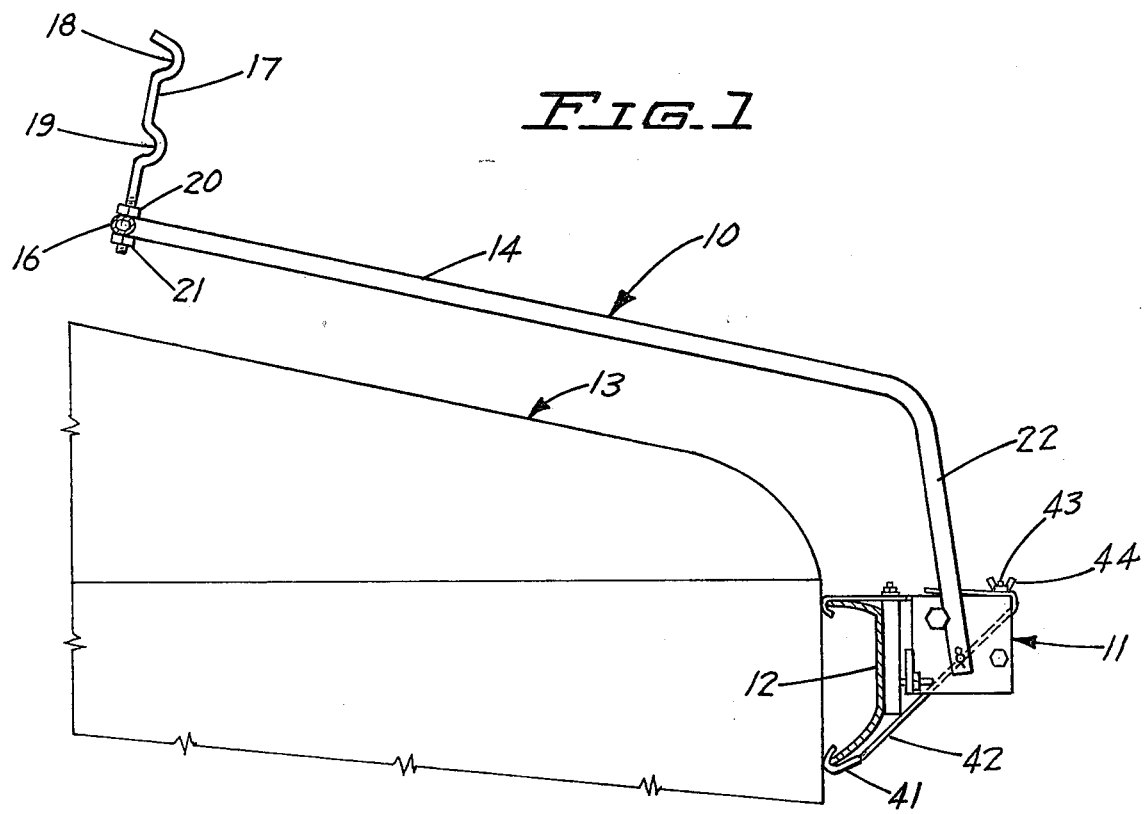
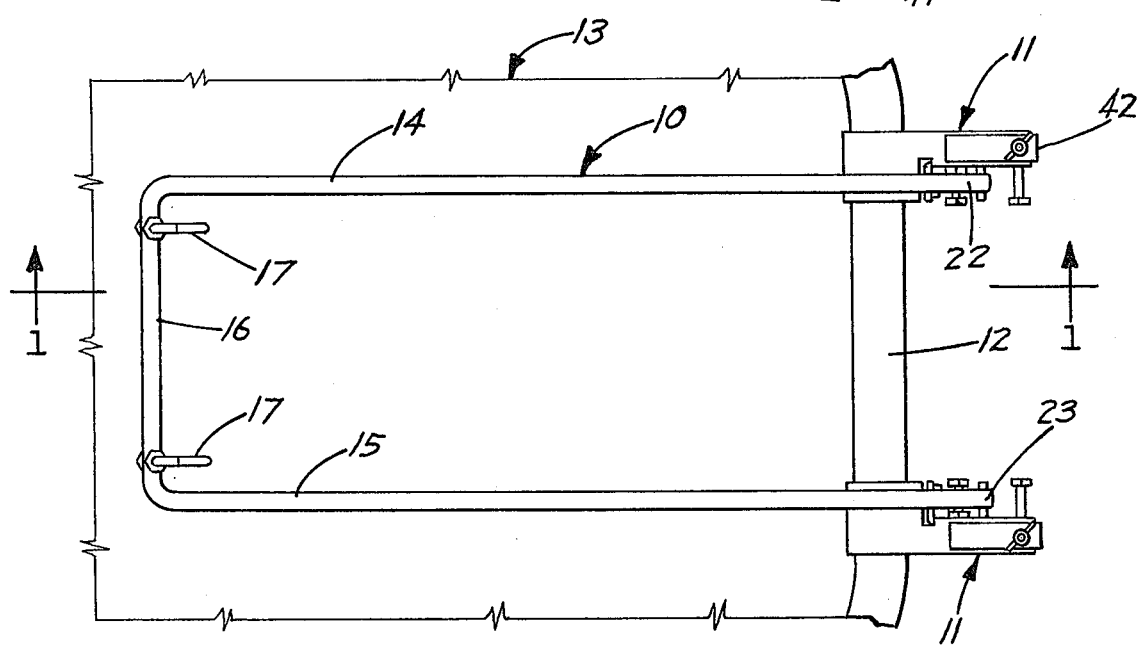

BICYCLE-SKI RACK FOR AUTOMOBILES

This invention is directed to a rack mountable on the rear bumper of an automotive vehicle for carrying lightweight recreational vehicles, namely bicycles or skis, for traveling. More particularly, the invention is directed to a bumper-mountable rack for carrying bicycles or skis over the rear deck of the trunk lid of an automobile generally parallel thereto.

BACKGROUND OF THE INVENTION

With the increased recreational use of bicycles, more and more people carry their bicycles by automobile to a suitable place for bicycling, a peaceful rural lane, a scenic bike trail, or the like. Because it is difficult, if not impossible, to carry most bicycles either within the passenger compartment or the trunk area of most automobiles, various exterior bike carriers have been devised and are offered for sale. Because none of the available carriers is entirely satisfactory, the present carrier has been developed, incorporating some of the advantages of prior art carriers without their inherent disadvantages.

THE PRIOR ART

Available bike carriers for cars are of three general types: roof-mounted, trunk-mounted and bumper-mounted. Roof-mounted carriers generally comprise a frame on which the bicycles are mounted upright and upside down longitudinally of the car. Since the bikes must be lifted to the top of the car, considerable strength is required. Because the bikes project upwardly from the roof their full height, considerable wind resistance is created, with resulting increased fuel consumption and lower mileage.

Trunk-mounted carriers are basically rectangular frames resting on four legs with rubber tips or suction cups mounted on the trunk lid of a passenger car. Since the bicycles are generally carried transversely and lying generally parallel to the trunk lid, wind resistance is lessened. However, the bicycle must still be lifted into position onto the carrier, requiring strength such as to be difficult for many persons.

Bumper-mounted carriers generally have a simple metal frame having clamping hardware along its lower edge which hooks on to the edges of the rear bumper to hold the frame in fixed upright position. The frame has an upper cross piece from which a pair of hooks or hangers protrude backwardly, and from which one or two bikes may be suspended by their frames. Bumper-mounted carriers are relatively easily loaded since the bicycles need be lifted only a relatively short distance from the ground. However, because the bikes are carried upright transversely of the automobile, they offer considerable wind resistance and require increased fuel consumption.

SUMMARY OF THE PRESENT INVENTION

The carrier, according to the present invention, incorporates the best features of trunk-mounted and bumper-mounted carriers without their disadvantages. The present carrier rack comprises a frame pivotally supported at one end in a pair of brackets mountable on the rear bumper of a passenger vehicle. For carrying bicycles, the frame is provided with a pair of protruding hangers or hooks from which one or more bicycles may be suspended. The frame is movable from an upright loading position in which the bicycles may be lifted relatively easily onto the hangers, and a lowered traveling position in which the bicycles are carried to offer minimum wind resistance. For carrying skis, the bicycle hangers are replaced by ski carrying clamps.

DESCRIPTION OF THE DRAWINGS

The invention is illustrated in the accompanying drawings in which:

FIG. 1 is a side elevation of the bicycle carrier according to the present invention mounted on the rear bumper of a passenger vehicle with the carrier frame in traveling position;

FIG. 2 is a top plan view thereof;

DESCRIPTION OF THE PREFERRED EMBODIMENT

Figure 3:
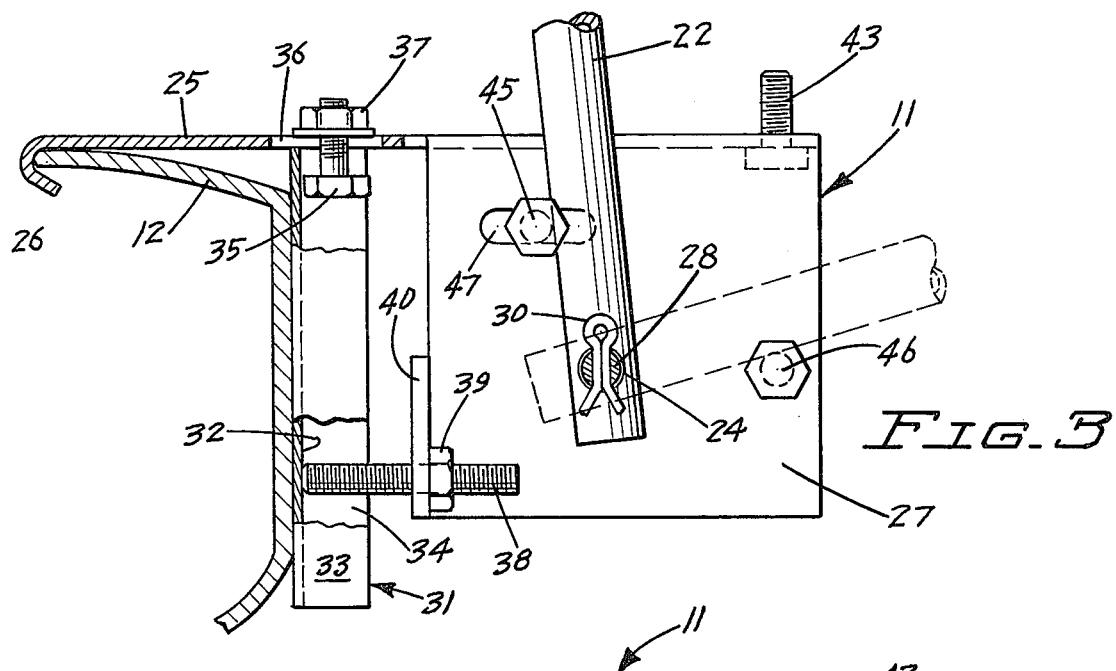
FIG. 3 is a side elevation of a bumper mounting bracket, partly broken away to show details of construction, and shown in engagement with an automobile bumper.
Figure 4:
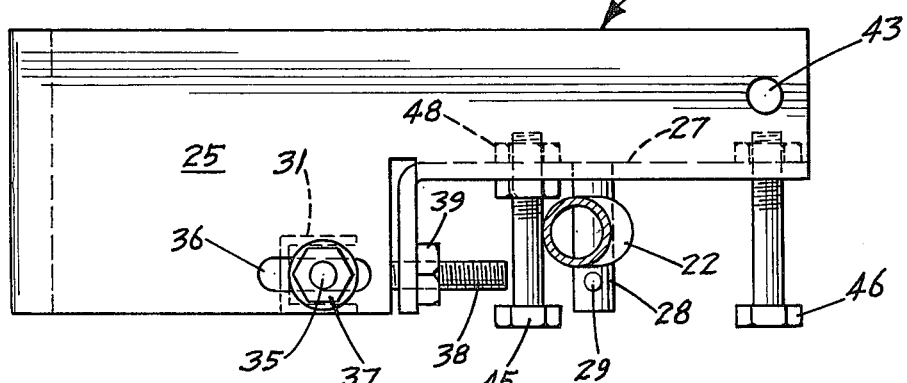
FIG. 4 is a top view of the bracket of FIG. 3.
Figure 5:
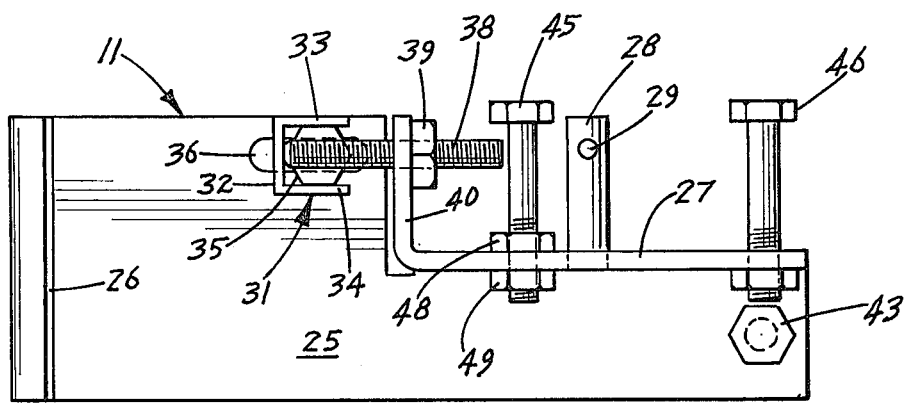
FIG. 5 is a bottom view thereof.
Figure 6:
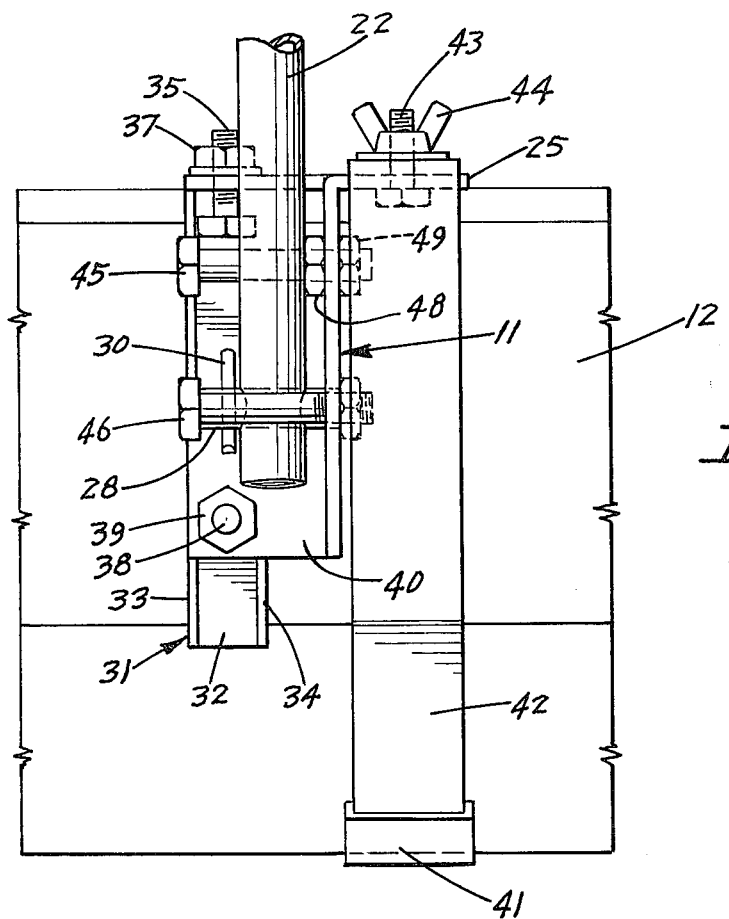
FIG. 6 is an end view thereof showing a further fastening means for securing the bracket to a bumper.

Referring now to the drawings, and particularly to FIGS. 1 and 2, there is shown a bicycle carrying frame, indicated generally at 10, pivotally supported at one end in a pair of brackets of similar construction, each indicated generally at 11. The brackets 11 are shown mounted on the rear bumper 12 of an automotive passenger vehicle, a portion of the rear deck area of which is shown at 13. The frame 10 is desirably generally U-shaped having a pair of generally parallel side members 14 and 15 connected at one end by a cross bar 16. The frame is desirably formed from rigid lightweight metal tubing. It may be formed in one piece as shown, or in two pieces with part of cross member 16 integral with side members 14 and 15 and connected telescopically, or cross member 16 may be a separate piece engaging the side members with a telescopic fit.

The frame extends in traveling position longitudinally of the automobile and lies spaced from and generally parallel to the trunk lid. A pair of bycycle hangers 17 of conventional design protrude upwardly from cross member 16 in traveling position. Hangers 17 may be formed, for example, from metal rod provided with a pair of recesses 18 and 19, screw-threaded at one end and secured to the cross member by means of a pair of nuts 20 and 21, as illustrated, or comparable hanger structure.

The ends of frame side members 14 and 15 opposite from cross member 16 are provided with angular extensions 22 and 23, respectively. The extensions 22 and 23 are desirably integral with their respective side members, but may be connected telescopically to the frame side members. The degree to which the extensions are angularly displaced from the general plane of the side members and cross member is determined in part by the rear profile of the passenger vehicle on which the carrier is to be mounted and the location of the adjustable stop means in brackets 11, as described in further detail hereinafter, for positioning the frame spaced above and generally parallel to the rear deck surface. As best seen in FIG. 3, each of the extension members has a transverse passage 24 adjacent its free end for engagement with the bumper mountable brackets 11.

The details of construction of brackets 11 is best seen by reference to FIGS. 3 through 6. Basically each bracket comprises a top horizontal plate 25 having a lip or hook 26 at its forward end. The lip or hook 26 is adapted to engage the inner top edge of a bumper 12 in the manner shown in FIGS. 1 and 3. The rearward portion of top plate 25 is of narrower width. A vertical plate 27 extends downwardly from the top plate 25 and longitudinally therewith approximately midway between the side edges of the wide forward portion of the top plate. Vertical plate 27 supports a horizontal pivot pin 28 welded or otherwise rigidly secured to plate 27 for the purpose of mounting the frame by virtue of engagement with the passages 24 in the frame extension members. A passage 29 extends through the pivot pin 28 adjacent its free end and retaining means, such as cotter pin 30, hold the frame in place.

The bracket 11 is clamped in place on bumper 12 by virtue of a vertically extending elongated bumper clamp 31. As illustrated, the bumper clamp is formed from channel stock having a central back plate 32 and parallel side plates 33 and 34. An externally threaded member, such as bolt 35, is welded or otherwise rigidly secured in the upper end of the channel forming the bumper clamp 31 and extends through longitudinal slot 36 in top plate 25. In this manner, the position of the bumper clamp 31 may be adjusted to compensate for variations in bumper profiles and thicknesses. A nut 37 holds the bumper clamp in position abutting the rear face of the bumper 12.

The bumper clamp 31 is further secured by screw clamp 38 in the form of a threaded rod which extends through a nut 39 or similar internally threaded member welded or otherwise secured to a tranverse vertical plate 40 secured to the forward edge of longitudinal vertical plate 27. The forward end of threaded rod 38 engages the inside surface of channel wall 32 adjacent the bottom end of bumper clamp 31 to hold the clamp in tight engagement with the bumper 12.

For further stability of the bracket 11, a lip or hook member 41 is secured to one end of a flexible member 42, which may be a strap, a chain, a cable, or the like. Hook 41 engages the lower rear edge of the bumper. The opposite end of the flexible member 42 is pulled up tight and secured to a bolt 43 fixed in the rearward end of top plate 25. The flexible member is then clamped in place over the bolt 43, as by means of a wing nut 44. If flexible member 42 is a chain, bolt 43 may be a J-bolt. Instead of being fixed in top plate 25, bolt 43 may be secured in a transverse vertical plate extending at a right angle from the rearward edge of plate 27.

Pivotal movement of frame 10 is limited and the traveling and loading positions of that frame are determined by a pair of stop pins 45 and 46 mounted on the bracket 11 on longitudinal vertical plate 27. The stop pins 45 and 46 are horizontal, extend transversely, and are generally parallel to pivot pin 28. Stop member 45 is in the form of a bolt, the threaded end of which extends through a longitudinal slot 47 and is held therein by means of a pair of nuts 48 and 49. The location of stop 45 is adjusted to compensate for variations in rear deck contours to permit the frame to rest in the traveling position generally parallel to and spaced upwardly from that rear deck. Stop 46 is also shown as a bolt. It is shown as fixed, being welded or otherwise rigidly secured to vertical plate 27. Optionally this stop may also be made adjustable, or it may be omitted.

Optional stop 46 determines the loading position of the frame. When the frame is pivoted so that frame extensions 22 and 23 rest against stop 46 (FIG. 3), the frame side arms 14 and 15 are then generally vertical and hangers 17 protrude rearward generally horizontal. With the frame in this position, the bicycles can be lifted easily so as to be suspended by their frames from the hangers. Then the bicycles are secured to the frame by means of lashing straps in generally the same manner as with conventional bumper-mounted carriers. Although less convenient, when stop 46 is omitted the frame may be positioned for loading by resting upon the bicycle to be loaded as the bicycle rests on the ground, or its movement may be limited, as by means of a restraining strap.

When the bicycles are secured, the rack frame is tilted forwardly until the extension members engage the forward stops 45. At this time, the frame and the bicycles are generally parallel to the rear deck surface with the frame spaced far enough above the deck surface that the handle bars and pedals extending through the frame do not chafe the surface. One or two restraining straps from the frame cross piece 16 to the hinged edge of the car's trunk lid then stiffen and stabilize the whole arrangement for safe travel. If desired, a blanket or other pad may be disposed over the trunk lid surface and/or between bicycles carried in the rack for maximum assurance against abrasion, scratching, marring, etc. of the bicycles and/or trunk lid. Because of the generally horizontal attitude of the carrier in traveling position, such padding does not act as an adverse resistance factor.

Figure 7:
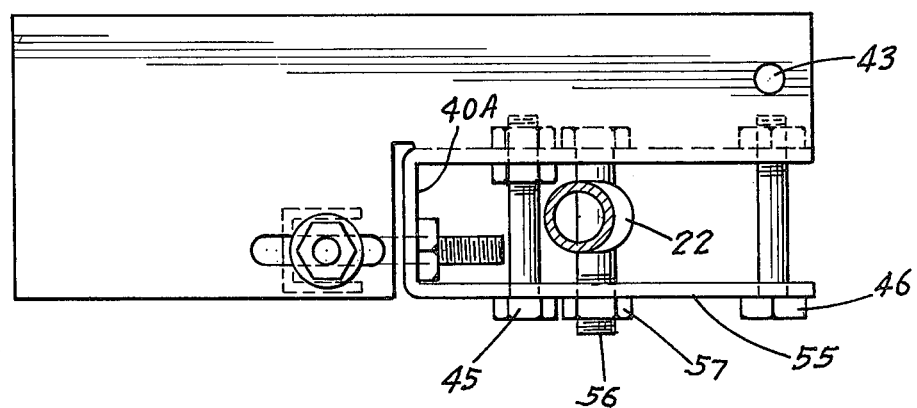
FIG. 7 is a top view of an alternative form of bracket.

FIG. 7 shows in top view an alternative form of clamping bracket in which a further longitudinal vertical plate 55 extends rearwardly from the edge of transverse vertical plate 40A spaced from and generally parallel to longitudinal transverse plate 27. Plate 55 is provided with a longitudinal slot in registry with slot 47 and stop member 45 extends through both slots in both vertical plates. Similarly, stop 46 extends through both plates. Pivot pin 28 is replaced by a bolt 56 which extends through both vertical plates and is secured by nut 57. The angular extensions of the frame extend between plates 27 and 55 and are engaged by pivot pin 56 passing through the transverse passage 24 of each of the extension members. This form of bracket provides somewhat greater stability for the frame.

Figure 8:
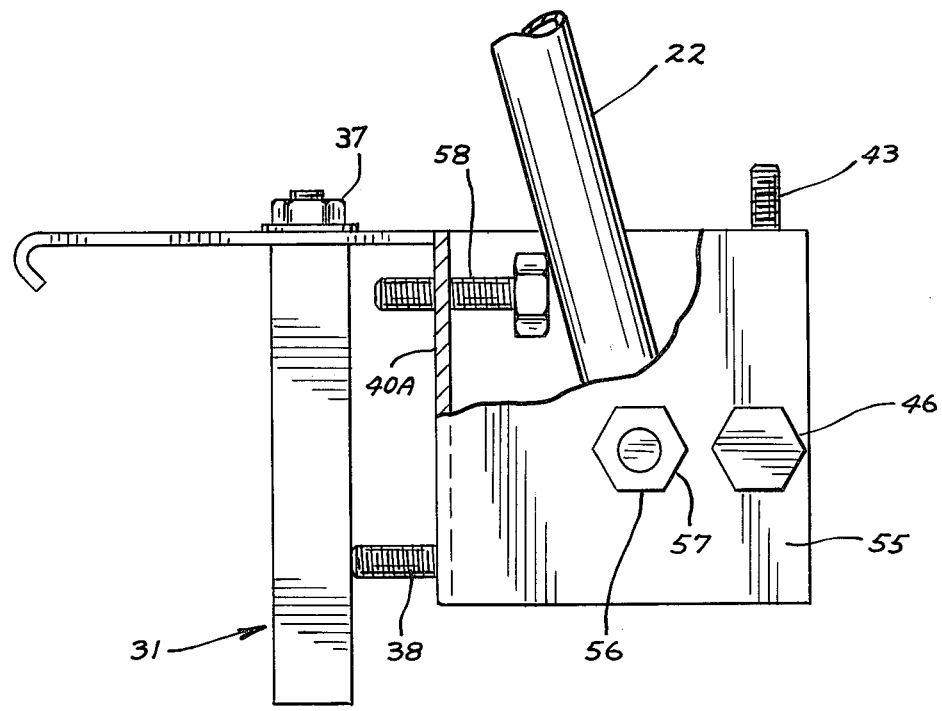
FIG. 8 is a side elevation of a further alternative form of bracket, partly broken away to show alternative forward stop means.

FIG. 8 shows in side elevation a further alternative form of clamping bracket generally similar to that of FIG. 7 except that stop member 45 is eliminated and replaced by an adjustable stop in the form of bolt 58. Bolt 58 threadably engages transverse vertical wall 40A. As shown, frame extension 22 rests against the head of bolt 58 in the traveling position. The spacing of the frame relative to the trunk lid is readily adjusted by adjustment of the bolt.

Although the clamping brackets as shown in FIG. 2 are shown as complementary right and left handed members mounted so as to engage the angular extensions of the frame on their inward faces, the positions of the brackets may be reversed so that the brackets are mounted on the bumper somewhat more closely together and the frame engages the outward faces of the brackets. Alternatively, instead of being complementary right and left handed members, a pair of either right or left handed members may be used, in which case one of the frame extensions will be mounted on an inward face of a bracket and the other will be mounted on an outward face of the other bracket.

The carrier of the present invention is easily installed and removed. It is adaptable to automotive vehicles of varying bumper design and rear deck contour. It offers the easy loading of a standard bumper-mounted bicycle carrier without the increased wind resistance of such a carrier and avoids the risk of wheel damage sometimes encountered in the use of conventional bumper-mounted carriers when the vehicle encounters abrupt driveway entrances and other uneven roadway conditions. The present carrier offers the lowered wind resistance advantage of conventional trunk-mounted carriers without the difficulty of loading such carriers.

For use as a ski carrier, the frame is modified by removing hangers 17 and installing a pair of conventional ski clamps spanning frame side members 14 and 15. The frame may be raised to vertical position for ease of loading of the skis and then lowered for traveling in the same manner as when bicycles are being carried.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. An automobile-mountable rack for carrying lightweight vehicles, said rack comprising:
   A. a pair of brackets adapted to be clamped horizontally spaced apart on the rear bumper of an automotive passenger vehicle, each of said brackets comprising
      1. a top horizontal plate having a lip at its forward end, said lip being engageable with the top inner edge of a bumper,
      2. a first vertical plate extending downwardly from the top plate and longitudinally therewith,
      3. a further transverse vertical plate at approximately a right angle to said first vertical plate intermediate between the ends of said top plate,
      4. an elongated vertical bumper-engaging clamping member extending downwardly from said top plate between said lip and transverse plate and adjustably mounted for limited movement therebetween,
      5. screw clamping means supported in said transverse plate and engageable with said clamping member,
      6. horizontal pivot means supported by said first vertical plate and spaced downwardly from said top plate, and
      7. stop means disposed on at least the side of said pivot means between the pivot and bumper,
   B. a frame pivotally supported in said brackets, said frame comprising
      1. a pair of generally parallel side members,
      2. an end member connecting said side members at one end, and
      3. a pair of angular extensions at the opposite ends of said side members, a transverse passage through each of the extensions adjacent the ends thereof, one of said passages engaging the pivot means of one of said brackets, the other of said passages engaging the pivot means of the other of said brackets, said extensions being engageable with said bracket stop means adjacent to but spaced from said pivot engaging passages whereby said frame is held spaced from the trunk lid of the automobile on which the rack is mounted such that said side members and end member overlie the rear deck of the trunk lid, and
   C. lightweight vehicle supporting means mounted on said frame.

2. A rack according to claim 1 further characterized in that:
   A. each of said brackets is provided with a further lip member engageable with the bottom inner edge of a bumper,
   B. said lip is attached to one end of a flexible tensioning member, and
   C. the opposite end of said tensioning member is adjustably engageable with said bracket adjacent the rearward end thereof.

3. A rack according to claim 1 further characterized in that said stop means comprises a transverse horizontal member projecting from said longitudinal vertical plate on one side of the pivot means and generally parallel thereto.

4. A rack according to claim 1 further characterized in that said stop means comprises a longitudinally extending horizontal member threadably engaging said transverse vertical plate and extending rearwardly therefrom.

5. A rack according to claim 3 further characterized in that said bracket includes a pair of stop means disposed on opposite sides of the pivot means and at least one of said stop means is adjustably supported in said vertical plate.

6. A rack according to claim 1 further characterized in that said bumper-engaging clamping member is adjustably supported in a longitudinal slot in said top plate for longitudinal movement relative thereto.

7. A rack according to claim 1 further characterized in that said screw clamping means is a horizontal threaded rod threadably engaged in said transverse vertical plate.

8. A rack according to claim 1 further characterized in that said frame is tubular and generally U-shaped.

9. A rack according to claim 1 further characterized in that said vehicle supporting means comprises a pair of bicycle hangers protruding from said end cross member at approximately right angles to the plane defined by the side and end members.

10. A rack according to claim 1 further characterized in that:
   A. each of said brackets is provided with a further lip member engageable with the bottom inner edge of a bumper,
   B. said lip is attached to one end of a flexible tensioning member,
   C. the opposite end of said tensioning member is adjustably engageable with said bracket adjacent the rearward end thereof,
   D. said bumper-engaging clamping member is adjustably supported in a longitudinal slot in said top plate for movement therein,
   E. said screw clamping means is a horizontal threaded rod threadably engaged in said transverse vertical plate, and
   F. said frame is tubular and generally U-shaped.

11. An automobile-mountable rack for carrying lightweight vehicles, said rack comprising:
   A. a pair of brackets adapted to be clamped horizontally spaced apart on the rear bumper of an automotive passenger vehicle, each of said brackets comprising:
      1. a forwardly extending rigid top lipped member, the lip of said member being engageable with the top inner edge of a bumper,
      2. an elongated vertical bumper-engaging member connected to said lipped member,
      3. at least one longitudinally extending vertical plate spaced rearwardly of the lip of said lipped member,
      4. horizontal pivot means supported by said vertical plate and spaced downwardly from said top lipped member,
      5. a vertical plate extending transversely from said longitudinally extending plate between the pivot means and the bumper and longitudinally extending stop means supported by said transverse vertical plate,
      6. a further flexible lipped member, the lip of said member being engageable with the bottom inner edge of a bumper, and
      7. means for adjusting the effective length of said flexible lipped member,
   B. a frame pivotally supported in said brackets, said frame comprising
      1. a pair of generally parallel side members,
      2. an end member connecting said side members at one end, and
      3. a pair of angular extensions at the opposite ends of said side members, a transverse passage through each of the extensions adjacent the ends thereof, one of said passages engaging the pivot means of one of said brackets, the other of said passages engaging the pivot means of the other of said brackets, whereby said frame is freely pivotal on said pivot means between a traveling position overlying the trunk lid of the automobile on which the rack is mounted and a loading position rearward of said trunk lid, the surface of said extensions being engageable in abutting surface contact with said bracket stop means adjacent to but spaced from said pivot engaging passages whereby said frame is held spaced from the trunk lid of the automobile on which the rack is mounted such that said side members and end member overlie the rear deck of the trunk lid, and
   C. lightweight vehicle supporting means mounted on said frame.

* * * * *